United States Patent
Booth et al.

(10) Patent No.: US 8,650,305 B2
(45) Date of Patent: Feb. 11, 2014

(54) CENTRALIZED SESSION MANAGEMENT IN AN AGGREGATED APPLICATION ENVIRONMENT

(75) Inventors: Alan E. Booth, Cary, NC (US); Donald N. Jones, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1800 days.

(21) Appl. No.: 11/136,132

(22) Filed: May 24, 2005

(65) Prior Publication Data

US 2006/0271684 A1    Nov. 30, 2006

(51) Int. Cl.
*G06F 15/16* (2006.01)

(52) U.S. Cl.
USPC .......................................... 709/227

(58) Field of Classification Search
USPC ............... 709/227, 223–226, 228–229; 726/8
See application file for complete search history.

(56) References Cited

U.S. PATENT DOCUMENTS

| | | | |
|---|---|---|---|
| 6,006,331 A | 12/1999 | Chu et al. | |
| 6,981,048 B1 * | 12/2005 | Abdolbaghian et al. | 709/228 |
| 7,143,437 B2 * | 11/2006 | Royer et al. | 726/8 |
| 2003/0056025 A1 | 3/2003 | Moses et al. | |
| 2003/0149781 A1 | 8/2003 | Yared et al. | |
| 2003/0188193 A1 | 10/2003 | Venkataramappa | |
| 2003/0191964 A1 | 10/2003 | Satyavolu et al. | |
| 2003/0233361 A1 | 12/2003 | Cady | |
| 2004/0044866 A1 * | 3/2004 | Casazza | 711/163 |
| 2005/0108390 A1 * | 5/2005 | Nickerson et al. | 709/224 |

* cited by examiner

*Primary Examiner* — Chirag R Patel
(74) *Attorney, Agent, or Firm* — Cuenot, Forsythe & Kim, LLC

(57) ABSTRACT

Embodiments of the invention provide a method, system and apparatus for centralized session management in an aggregated application environment. In one embodiment, a centralized session management method can include aggregating a set of applications in a host aggregation environment. Subsequently, each of the applications can be centrally kept alive so as to avoid a time out condition in any one of the applications so long as interactivity is detected within any one of the applications or within the host aggregation environment. In one aspect of the invention, the aggregating step can include aggregating a set of portlets in a portal environment.

15 Claims, 2 Drawing Sheets

CENTRALIZED SESSION MANAGEMENT IN AN AGGREGATED APPLICATION ENVIRONMENT

BACKGROUND OF THE INVENTION

1. Field of the Invention

The present invention relates to the field of session management in a distributed client server application environment, and more particularly to session management in an aggregated application environment.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active application components included as part of portal pages. Similar to the graphical windows paradigm of windowing operating systems, each portlet in a portal occupies a portion of the portal page through which the portlet can display associated content from a portlet channel. Portlets are known to include both simple applications such as n electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Despite the inclusion of each portlet application in a single, portal environment, each portlet application can require the creation of a separate session as between the portlet application and back-end systems application on behalf of an interacting user. Specifically, the session can be used to facilitate access control to the data for the portlet application. To avoid the clumsiness of multiple authentication processes for each portlet application in a portal environment, a single sign-on (SSO) authentication process can be included in the portal environment. In an SSO authentication process, an interacting user can provide authentication data once and the SSO authentication process can provide the authentication data to each dependent application.

Notwithstanding the conveniences of the SSO authentication process, individual portlet applications, for the sake of security, often monitor interactions with interacting users. When too much time has elapsed since a last interaction with an interacting user, the session established with the interacting user can be terminated thereby forcing the interacting user to re-authenticate at a later time. Yet, in a portal environment, an interacting user may allow one portlet application to go idle while interacting with other portlet applications in the portal environment. To require re-authentication for idled portlet applications, however, can defeat the convenience of the SSO authentication process.

BRIEF SUMMARY OF THE INVENTION

Embodiments of invention address deficiencies of the art in respect to session management in an aggregated application environment and provide a novel and non-obvious method, system and apparatus for centralized session management in an aggregated application environment. In one embodiment, a centralized session management method can include aggregating a set of applications in a host aggregation environment. Subsequently, each of the applications can be centrally kept alive so as to avoid a time out condition in any one of the applications so long as interactivity is detected within any one of the applications or within the host aggregation environment. In one aspect of the invention, the aggregating step can include aggregating a set of portlets in a portal environment.

The keeping alive step can include establishing a table of sessions for the applications where each entry in the table can include a session identifier, a corresponding time-out value and a time of last access. Interactivity can be detected in one of the sessions. Responsive to the detection, the table can be traversed, individual ones of the sessions can be selected to be kept alive based upon the corresponding time-out value and an elapsed time since the time of last access, the selected individual ones of the sessions can be kept alive, and the table can be updated with new times of last access for the sessions. Moreover, the keeping alive step can include performing the traversing, selecting and keeping-alive steps in response to detecting interactivity in the host aggregation environment.

In another embodiment of the invention, a system for centralized session management in a host aggregation environment can include centralized session management logic programmed to keep alive each application in an aggregation in the host aggregation environment so as to avoid a time out condition in any one application in the aggregation so long as interactivity is detected within any one application in the aggregation or within the host aggregation environment. The host aggregation environment can include a portal environment, wherein each application can include a portlet and wherein the aggregation can be a portal. A table of sessions for each application in the aggregation further can be included. Each entry in the table can include a session identifier, a corresponding time-out value and a time of last access.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and apparatus for centralized session management in an aggregated application distribution system. In accordance with an embodiment of the present invention, a centralized session manager can track the time-out state for a session associated with each application in an aggregation. When necessary, the centralized session manager can keep alive each application in the aggregation so as to avoid a time-out condition in any one of the applications in the aggregation so long as activity can be detected within the aggregation or the host environment of the aggregation. In this regard, the host environment can be a portal environment hosting a portal having a multiplicity of portlets.

Figure 1:
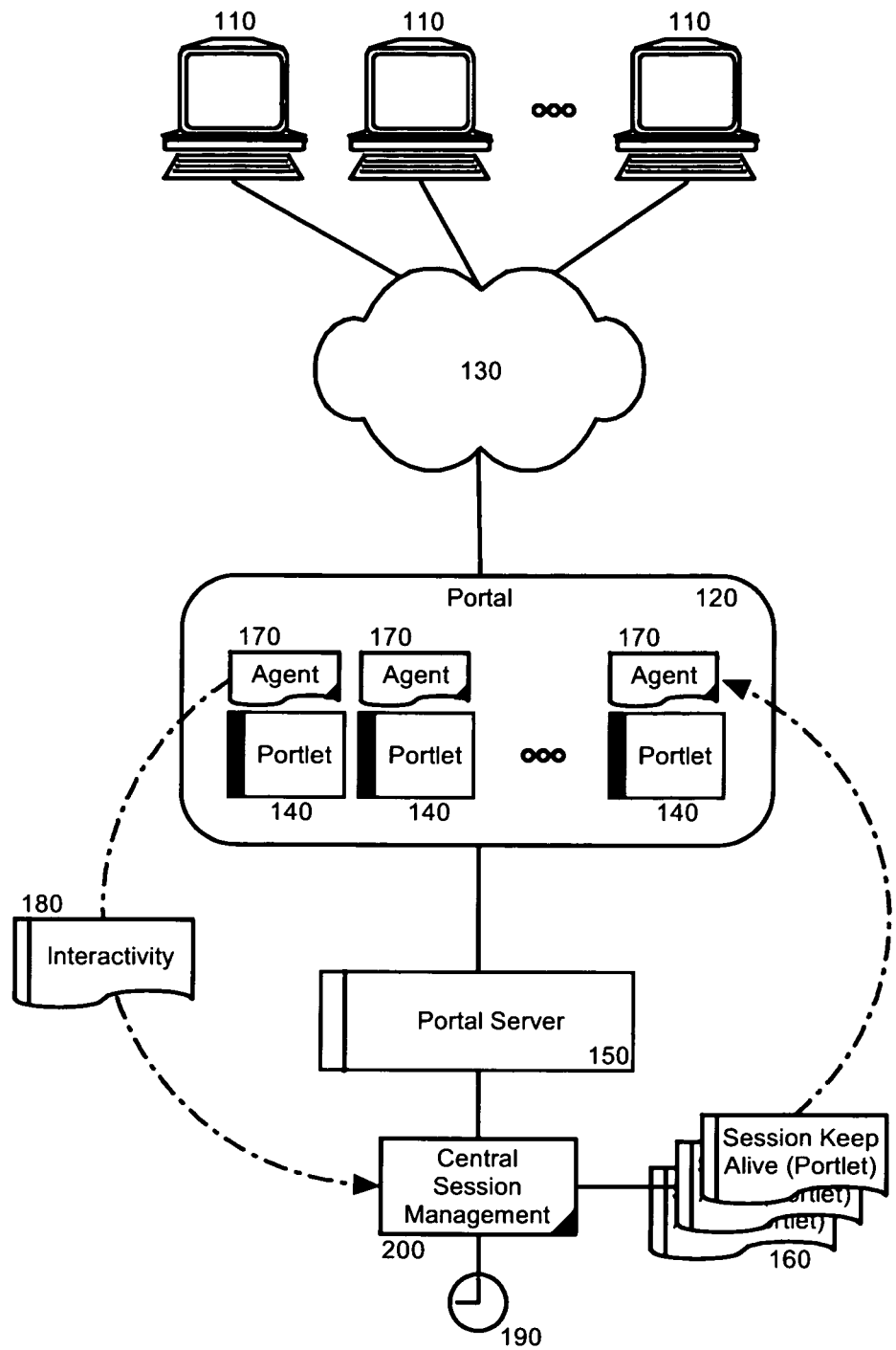
FIG. 1 is a schematic illustration of an aggregated application distribution system configured for centralized session management in accordance with the inventive arrangements; and, FIG. 2 is a flow chart illustrating a process for centralized session management in an aggregated application distribution system.

In further illustration, FIG. 1 is a schematic illustration of an aggregated application distribution system configured for centralized session management. The aggregated application distribution system can include a host environment 150 such as a portal server hosting an application aggregation 120 such as a portal including one or more applications 140 such as a set of portlets. As configured, one or more interacting users through clients 110 can access the applications 140 in the aggregation 120 through a computer communications network 130.

Centralized session management logic 200 can be coupled to the host environment 150. The centralized session management logic 200 can be communicatively coupled to one or more application agents 170, each of the application agents 170 having a linkage with a corresponding application 140 in the aggregation 120. The agents 170 can be programmed to detect interactivity within the corresponding application 140 and can report the interactivity 180 to the centralized session management logic 200. Likewise, the centralized session management logic 200 can be programmed to detect interactivity 180 within the aggregation 120, itself.

The programming of the centralized session management logic 200 can be configured to transmit keep-alive messages 160 to the agents 170 whenever interactivity 180 is detected. Responsive to receiving the keep-alive messages 160, the agents 170 can keep alive the corresponding applications 140 even though session activity within any particular one of the applications may have exceeded a predefined time out. More specifically, the centralized session management logic 200 can maintain a table 190 (or a combination of tables) in which each entry specifies one of the applications 140, an associated predefined time out, and an associated last-accessed time stamp.

In operation, as sessions are initiated for different ones of the applications 140, each session can be registered with the centralized session management logic 200 and an entry can be written to the table 200. The entry can include the identity of the application 140 and a maximum time out value for the session. As interactivity 180 is detected with respect to the session, the entry can be updated to indicate a time for the interactivity 180. Periodically, according to a minimum time stamp for the aggregation 120, the centralized session management logic 200 can traverse the table and, where necessary, a keep alive message can be forwarded to the agents 170. The agents 170, in turn, can keep alive corresponding ones of the applications 140, for instance by pinging the corresponding ones of the applications 140. In this way, sessions for individual ones of the applications 140 need not expire though interactivity 180 has occurred with respect to other ones of the applications 140. Moreover, in consequence the time out logic for the individual applications 140 need not be disabled.

Figure 2:
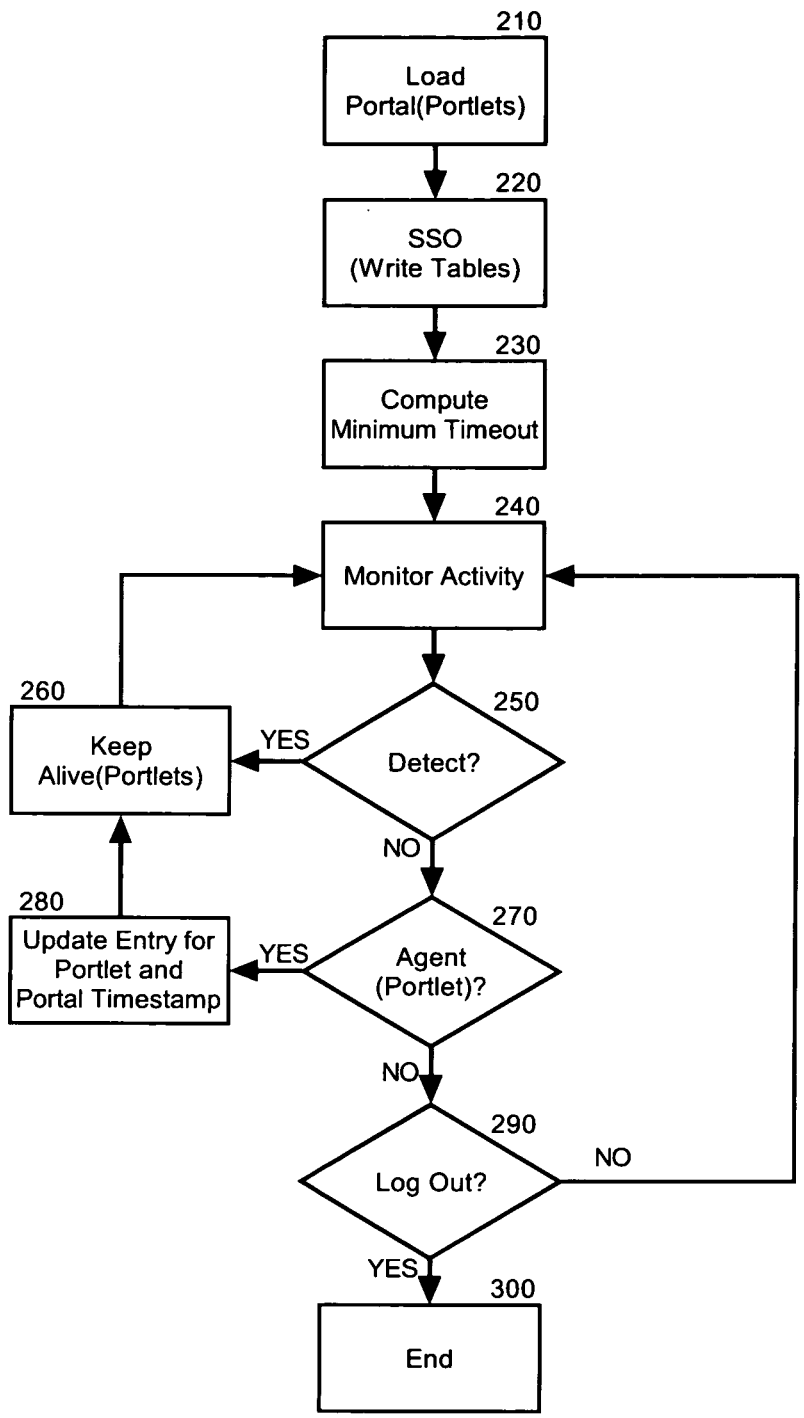

In further illustration of the operation of the centralized session management logic, FIG. 2 is a flow chart illustrating a process for centralized session management in an aggregated application distribution system. Beginning in block 210, a selection of applications, for example portlets, can be loaded in an aggregation of applications, for example a portal. In block 220, a single sign-on (SSO) operation can be performed in which authenticated sessions can be established with different ones of the applications, though an SSO process. As part of the SSO operation, table entries can be written for each of the sessions to indicate a time-out value for the sessions and a last time each of the sessions experienced activity.

A minimum time-out can be computed for the aggregation so that no one of the applications in the aggregation can be permitted to expire during the duration of time in between attempts to keep alive different ones of the applications. Specifically, in block 240, the aggregation can be monitored to detect interactivity, either within any one or more of the applications in the aggregation, or in the aggregation itself. In decision block 250, if interactivity is detected in the aggregation, in block 260 the table can be traversed to identify different ones of the application which are to be kept alive and a keep-alive directive can be forwarded to the identified applications and the timestamp of last activity can be updated in the table for the entries corresponding to the identified applications. The process subsequently can repeat in block 240.

In decision block 270, if interactivity is reported by an agent to any one of the applications in the aggregation, in block 280, the timestamp of last activity can be updated in the table for the entry corresponding to the application in which interactivity had been reported. Subsequently, in block 260 the table can be traversed to identify different ones of the application which are to be kept alive and a keep-alive directive can be forwarded to the identified applications and the timestamp of last activity can be updated in the table for the entries corresponding to the identified applications. The process subsequently can repeat in block 240. In decision block 290, if a log out has not been detected for the aggregation, the process likewise can repeat in block 240. Otherwise, the process can end in block 300.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A centralized session management method, comprising:
aggregating a set of applications in a host aggregation environment;
monitoring for interactivity within all said applications within said set;
separately monitoring for interactivity within said host aggregation environment;
detecting interactivity within
any one of said applications or
said host aggregation environment; and
centrally keeping alive all said applications to avoid a time out condition in any one of said applications by forwarding a keep alive directive to at least one of said applications upon said detecting, wherein
said centrally keeping alive comprises:
establishing a table of sessions for said applications, and
responsive to detecting interactivity in one of said sessions, selecting individual ones of said sessions to be kept alive based upon a corresponding time-out value and an elapsed time since a time of last access.

2. The method of claim 1, wherein
a set of portlets are aggregated in a portal environment.

3. The method of claim 1, wherein:
each entry in said table comprising
a session identifier
the corresponding time-out value, and
the time of last access.

4. The method of claim 1, further comprising
keeping alive said selected individual ones of said sessions in response to the detecting interactivity in said host aggregation environment.

5. The method of claim 1, wherein
said detecting comprises receiving a notification of interactivity from an agent corresponding to an application is which interactivity is detected.

6. The method of claim 1, wherein
said keep-alive directive is forwarded to individual agents corresponding to individual ones of said applications.

7. A computer hardware system for centralized session management in a host aggregation environment, comprising:
at least one processor, the at least one processor configured to
monitor for interactivity within all applications in an aggregation in said host aggregation environment;
separately monitor for interactivity with the host aggregation environment,
detect interactivity within
any one application in said aggregation or
the host aggregation environment,
keep alive all said applications in said aggregation to avoid a time out condition in any one application in said aggregation conditioned upon interactivity being detected within any one application in said aggregation or within the host aggregation environment, and
forward a keep alive directive to at least one of said applications upon interactivity being detected, wherein
said keep alive all said applications comprises:
establishing a table of sessions for said applications, and
responsive to detecting interactivity in one of said sessions, selecting individual ones of said sessions to be kept alive based upon a corresponding time-out value and an elapsed time since a time of last access.

8. The system of claim 7, wherein
the host aggregation environment comprises a portal environment,
each application comprises a portlet, and
said aggregation is a portal.

9. The system of claim 7, wherein
each entry in said table comprising:
a session identifier,
the corresponding time-out value, and
the time of last access.

10. The system of claim 7, further comprising
a plurality of agents, each of said agents corresponding to each of said applications in said aggregation, wherein
each of said agents communicatively coupled to said processor to report interactivity in each of said corresponding applications in said aggregation.

11. A computer program product, comprising:
a computer readable storage device having stored therein a computer readable program,
the computer readable program, when executed on a computer hardware system, causes the computer hardware system to:
aggregate a set of applications in a host aggregation environment;
monitor for interactivity within all applications in an aggregation in said host aggregation environment;
separately monitor for interactivity with the host aggregation environment, detect interactivity within
- any one of said applications or
- said host aggregation environment, and centrally keep alive all said applications to avoid a time out condition in any one of said applications conditioned upon interactivity being detected within any one of said applications or within said host aggregation environment by forwarding a keep alive directive to at least one of said applications upon said detection, wherein said centrally keep alive comprises:
- establishing a table of sessions for said applications, and
- responsive to detecting interactivity in one of said sessions, selecting individual ones of said sessions to be kept alive based upon a corresponding time-out value and an elapsed time since a time of last access.

12. The computer program product of claim 11, wherein a set of portlets are aggregated in a portal environment.

13. The computer program product of claim 11, wherein: each entry in said table comprising a session identifier, the corresponding time-out value, and the time of last access.

14. The computer program product of claim 11, wherein the computer readable program, when causing the computer hardware system to detect interactivity, causes the computer hardware system to receive a notification of interactivity from an agent corresponding to an application in which interactivity is detected.

15. The computer program product of claim 11, wherein the keep-alive directive is forwarded to individual agents corresponding to individual ones of said applications.

* * * * *